W. G. WAGNER.
SPRING TIRE.
APPLICATION FILED JUNE 3, 1920.
1,392,667.
Patented Oct. 4, 1921.
2 SHEETS—SHEET 1.
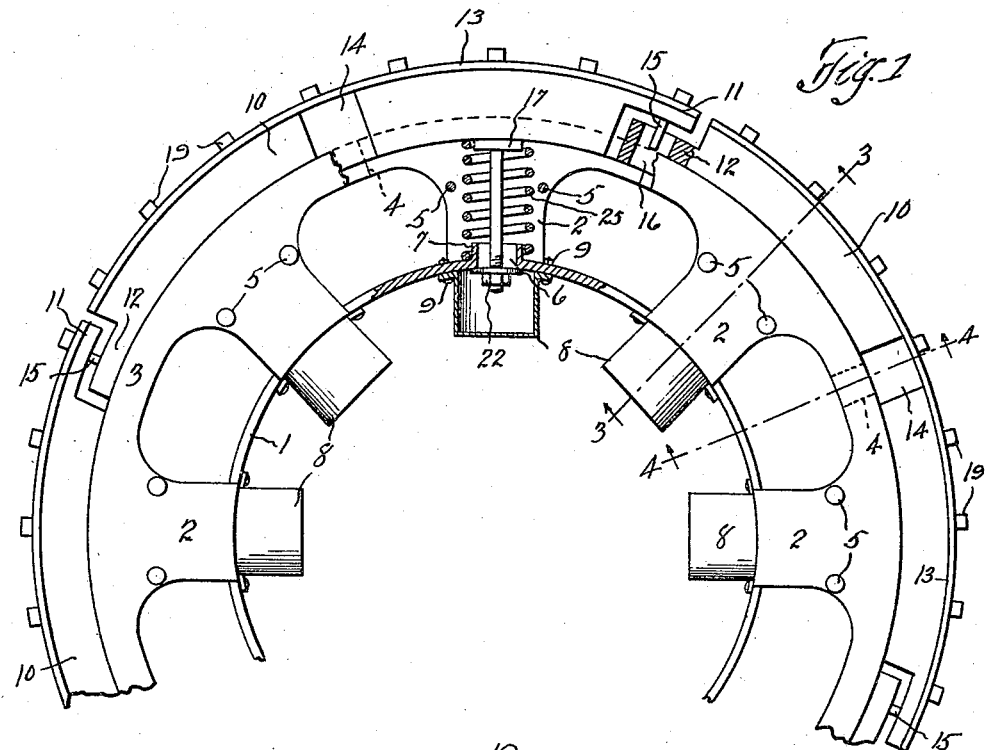
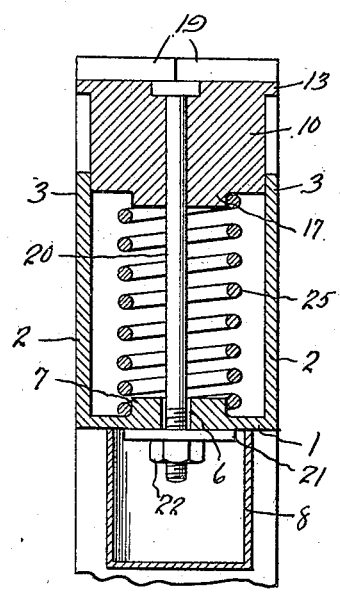
Inventor
W. G. Wagner
Attorneys

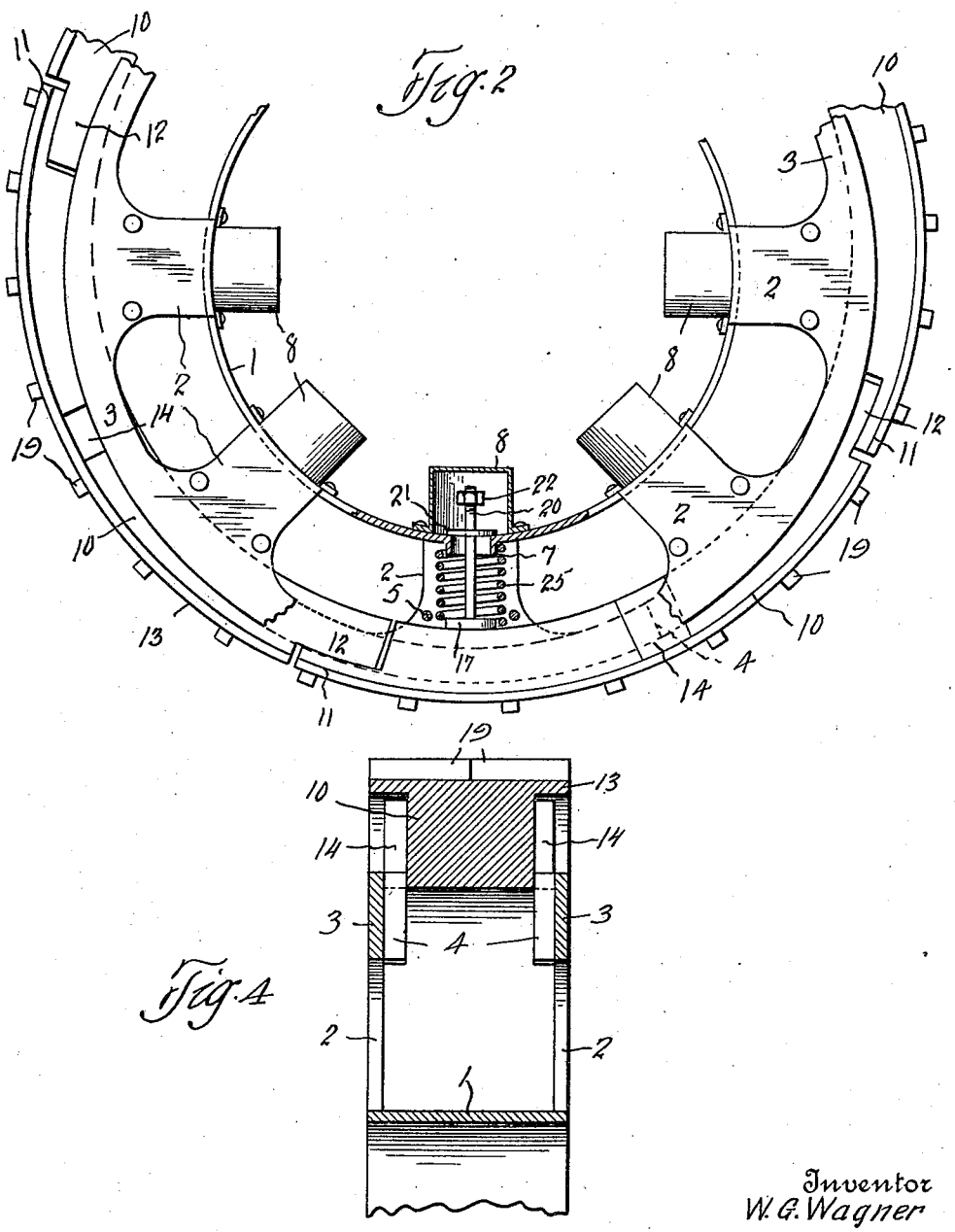

UNITED STATES PATENT OFFICE.

WILLIAM G. WAGNER, OF CARTER, SOUTH DAKOTA, ASSIGNOR TO ALICE BELLE WAGNER, OF CARTER, SOUTH DAKOTA.

SPRING-TIRE.

1,392,667.  Specification of Letters Patent.  Patented Oct. 4, 1921.

Application filed June 3, 1920. Serial No. 386,160.

*To all whom it may concern:*

Be it known that I, WILLIAM G. WAGNER, a citizen of the United States, residing at Carter, in the county of Tripp, State of South Dakota, have invented certain new and useful Improvements in Spring-Tires; and I do hereby declare the following to be a full, clear, and exact description of the invention, such as will enable others skilled in the art to which it appertains to make and use the same.

This invention relates to wheels, and more especially to resilient tire rims of metal such as contain no rubber or other elastic material; and the object of the same is to produce a tire of this kind capable of application to the felly of a rigid wheel, the tire itself containing springs so as to impart resiliency to the wheel when thus equipped.

The tire is made up of two main parts respectively described as the tread and tire rim, the former being in sections severally and yieldably mounted around the rim and the latter as a whole mounted upon the wheel body by means forming no part of the present invention and therefore not illustrated. In fact, the structure can be made and sold for application to rigid wheels with only a slight modification in the fellies thereof.

Details of the preferred manner in which this invention is carried out are set forth in the following specification and claims, and reference is made to the drawings wherein:

Figure 1 is a side elevation of a portion of this tire with its parts assembled, one of the so-called spokes and the corresponding cup being in section.

Fig. 2 is a view similar to Fig. 1 showing the position of parts when pressure is applied.

Fig. 3 is a cross section on the line 3—3 of Fig. 1, and Fig. 4 a sectional detail on the line 4—4 thereof.

The inner element of this tire which as a whole may be called the "tire rim" is by preference made in one piece comprising a band 1 adapted to slip onto and be fastened around the felly not shown and by means not necessary to describe, and flanges outstanding from its side edges and preferably cut away so as to leave radial strips or spokes 2 opposite each other and parallel rings 3 connecting their outer extremities as seen. At intervals and preferably between spokes lugs or blocks 4 are cast on or attached to the inner faces of the rings for a purpose yet to appear, and at intervals also the sides of the structure are connected by tie rods 5, preferably disposed at points where the spokes are widened at their outer ends and merge into the rings. Said spokes are disposed in pairs with the members opposite each other, and between such pairs the band is provided with circumferential slots 6 and is preferably formed with outstanding bosses 7 surrounding the slots. Also a cap or cup 8 is detachably connected with the band, as by bolts 9, and projects inward from the band to cover each slot for a purpose yet to appear. It may be here remarked that the wheel felly will have to be cut out with notches for the reception of these cups, but otherwise the band is smooth on its inner face and may be slipped onto the felly and fastened in any appropriate manner.

The outer element of this tire which is called a tread is made up of a plurality of sections 10 having scarfed ends so as to overlap and underlap each other as at 11 and 12 and yet leave considerable looseness for purposes which will appear. The body of each section is of a width to fit loosely between the two rings 3, and around its outer edge it is somewhat wider so as to provide side flanges 13 extending over the edges of said rings and standing sufficiently remote from them so as not to contact therewith except under the strain of very heavy loads; and the peripheral face of each section is provided with cleats or spurs 19 for increasing the traction of the wheel. The scarfed ends 11 and 12 are provided with pin-and-slot connections 15 and 16 respectively so as to permit the relative movements of the sections which are necessary. Each section is also provided with notches 14 to loosely receive the blocks 4 to prevent creeping. I consider it advisable to employ at least four sections on the smallest wheel, and each section should overlie two of the slots 6 and be provided with two inwardly projecting bosses 17 in normal radial alinement with those numbered 7.

Rigidly inserted through each end portion of each section 10 from the outside thereof is a bolt 20, its body passing through the section and its boss 17, thence by preference extending inward between a pair of spokes 2, then passing through an inner boss 7 and loosely through a slot 6, and its threaded end receiving a washer 21 and a nut 22 and standing within a cup 8, although the latter can be removed to gain access to the nut for adjustment, etc. Surrounding each bolt is a stout helical spring 25, its inner end fitting around the boss 7 and its outer end around the boss 17, and its coils are quite ample so that the bolt has freedom of movement in all directions within the spring, and yet the latter should not touch the inner faces of the spokes 2 which might cause rattle. As each section 10 is provided with two such bolts, it is obvious that they converge slightly because they are strictly radial to the wheel. Therefore when the section is moved inward by pressure, the bolts move inward along parallel lines rather than on lines along their own axes, and this accounts for the provision of the slots 6 in the band 1. Also when strain is thrown on the wheel and a section moves circumferentially within the rim as permitted by the looseness between its notches 14 and the blocks 4, the bolts move with the section as is permitted by said slots 6. Finally, when the tire is to be made "stiffer" which is effected by setting up the nuts 22, or when different springs are inserted, the slots 6 will be found necessary. The openings between the spokes make the structure lighter and permit dirt and extraneous matter to fall out and to be blown out constantly. Not only is the tire as a whole capable of being fixedly mounted on the wheel or removably mounted if preferred, but its parts can be disconnected for cleaning and repair. The structure contains no elements which are of elastic or flexible material such as rubber, leather, and fabric; and if and when the springs lose their resiliency, they can be replaced.

What is claimed is:

1. A spring tire including a tread formed of arcuate sections loosely connected together, a rim comprising a ring from the opposite edges of which extend outwardly parallel pairs of spokes the outer ends of which are connected by a pair of rings, the tread sections having lateral flanges extending transversely of the peripheries of the said rings, bolts extending inwardly from each tread section between the spokes of each of said pairs and through the rim ring, and coil springs on the bolts between the rim ring and the tread sections, and interlocking connections between the rim and tread.

2. A spring tire comprising a sectional tread member and a rim member, the sections of the tread member being loosely connected together, the rim member including an inner band concentric to the tread member and having outwardly radiating pairs of spokes connected at their outer ends by circular ring portions which support the tread sections, inwardly radiating bolts carried by the tread sections extending between adjacent pairs of spokes and through the inner band, the tread sections having bosses surrounding the adjacent ends of the bolts respectively, the band having outwardly directed bosses surrounding the adjacent portions of the bolts respectively, casing radiating inwardly from the band and receiving the inner ends of the bolts, a coil spring encircling each bolt and having its opposite ends embracing the first- and second-named bosses, and interlocking connections between the rim and tread.

In testimony whereof I affix my signature, in the presence of two witnesses.

WILLIAM G. WAGNER.

Witnesses:
ALICE B. WAGNER,
ROSCOE KNODELL.